United States Patent [19]
Morzynski

[11] 3,811,716
[45] May 21, 1974

[54] SYSTEM FOR LOCKING A HUB OF ROTODYNAMIC PUMP ROTOR ON PUMP SHAFT

[76] Inventor: Stanislaw Morzynski, Zamenhofa St. 13/6, Zabrze, Poland

[22] Filed: Dec. 27, 1972

[21] Appl. No.: 318,855

[30] Foreign Application Priority Data
Mar. 1, 1972 Poland .................................. 152737

[52] U.S. Cl. ............ 403/204, 287/DIG. 7, 285/321
[51] Int. Cl. ........................................... F16b 11/00
[58] Field of Search ............... 287/DIG. 7, 53 R, 52; 285/308, 321; 416/244, 244 A; 74/531; 192/65

[56] References Cited
UNITED STATES PATENTS

| | | |
|---|---|---|
| 3,398,977 | 8/1968 | Yoneda ............................ 285/321 |
| 2,210,811 | 8/1940 | Kelpsch ...................... 287/DIG. 7 |
| 2,539,387 | 1/1951 | Alden ............................... 287/53 R |

FOREIGN PATENTS OR APPLICATIONS

| | | | |
|---|---|---|---|
| 692,526 | 8/1964 | Canada ............................ 285/308 |
| 1,118,012 | 11/1961 | Germany ........................... 416/244 |

*Primary Examiner*—Jordan Franklin
*Assistant Examiner*—Conrad L. Berman
*Attorney, Agent, or Firm*—Waters, Roditi, Schwartz & Nissen

[57] ABSTRACT

A disconnectable locking system or arrangement between a rotor hub and pump shaft of a roto-dynamic pump when a shaft portion is inserted into a bore of the hub, including a locking sleeve on the shaft adapted to be moved by the action of a threaded nut so as to have one end thereof extend into the hub bore until a thrust shoulder on the sleeve engages the hub, the end of the sleeve being chamfered and adapted to contact a first split ring positioned in a recess in the hub bore so as to in turn contact a second split ring fastened to the shaft and forming a thrust surface with said first split ring.

3 Claims, 1 Drawing Figure

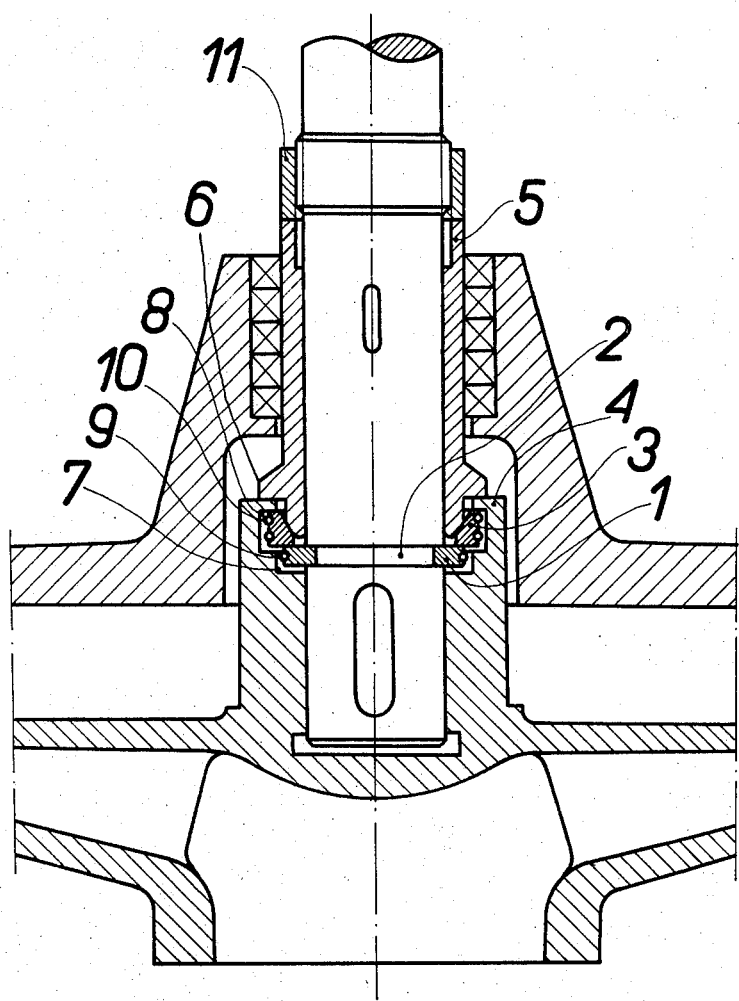

SYSTEM FOR LOCKING A HUB OF ROTODYNAMIC PUMP ROTOR ON PUMP SHAFT

Field of the Invention

The present invention relates to a system for locking the hub of pump rotor onto the shaft of a roto-dynamic pump.

Discussion of the Prior Art

At present, systems are known which are adapted to provide for locking of the hubs of rotor-dynamic pumps onto the shafts of the pumps. The primary purpose of these systems is to protect the hub of a rotor against axial displacement through the use of nuts or threaded sleeves which interconnect the shafts and pump hubs.

The drawbacks of these prior art systems lie in the unilateral action of the screwed or threaded hub and shaft connections, such connections being subject, in the case of reversal of the rotation of the pump, to a tendency of unscrewing and thereby unlocking or disengaging the hub of the rotor from its connected shaft.

Summary of the Invention

Accordingly, an object of the present invention is to provide a reliable locking system or arrangement for a pump rotor onto the shaft irrespective of the direction of pump rotation, and with the locking system concurrently facilitating the ready and simple assembly and disassembly of the pump rotor. In accordance with the foregoing, the present rotor hub and shart connecting system has been developed in which a stable locking of the pump rotor onto the pump shaft is effected in both of directions of shaft rotation, and irrespective of the type of liquid being pumped, as well as providing for the ready and simplified replacement of the pump rotor.

The invention contemplates the use of two jointly operating split rings, with a first one of the rings being located in a peripheral groove formed in the pump shaft, the radially inner surface of the ring contact the bottom of the groove and the radially outer surface of the ring projecting outwardly of the external diameter of pump shaft, and with the second one of the rings being located in an internally formed groove within a machined bore of the rotor hub. Thus, when a nut is threaded onto the pump shaft, a lock sleeve is adapted to be moved axially forwardly whereby the leading end of the sleeve is driven beneath the radially inner, suitably shaped surface of the second split ring. A peripheral chamfered surface, in relation to the direction of its axial movement, formed on the leading end of the sleeve causes the pressing force exerted thereby on the ring to be resolved into two components, in effect, a radial component, and an axial component. The radial component, which tends to expand the ring, presses the latter against the bottom surface of the internal groove machined in the bore of the rotor hub, while the axial component presses the second ring against the first ring, so as to axially consolidate the hub and shaft connecting system. The lock sleeve has a peripherally projecting annular shoulder located shortly above it leading end face, with the shoulder having a surface pressing against the end of the rotor hub, so as to thereby position the pump rotor onto the pump shaft. The inner cylindrical or hollow portion of the rotor hub is provided with a machined step-like annular recess within which are located the split rings. The outer circumferential surfaces of each of the split rings are encompassed by annularly extending springs which clasp the rings so as to normally bias them radially inwardly into closed position.

A characteristic feature of the inventive pump hub and shaft connecting system is its excellent operative reliability and stability, and through the use of various materials, its superior resistance to corrosion, the present system providing for a reliable connecting joint preventing the possibility of any inadvertent unlocking of the pump components during reversed running of the pump shaft. The system is simple to manufacture, while its assembly and disassembly sequence is easily facilitated.

Brief Description of the Drawing

An embodiment of a pump hub and shaft connection according to the invention is now described, by way of example, with reference to the single figure of the accompanying drawing.

Detailed Description

Referring now in detail to the drawing, a split ring 1 is positioned in an external peripheral groove of a pump shaft 2, with the ring being encompassed by a spring 9 tending to bias the ring into closed position. A split ring 3 contacts a lock sleeve 5 with its inner radial surface, with ring being encompassed by springs 10 similar to that of spring 9 and ring 2. A hub 4 formed on a pump rotor (not shown) is provided with an internal annular recess of stepped configuration having a first recess portion 7 and an enlarged recess portion 8 communicating with the first recess portion 7. The split ring 2 is adapted to be positioned within recess 7, and split ring 3 within recess 8. The sleeve 5 is axially moved along the shaft 2 by a threaded nut 11 cooperatively engaging threads formed on the surface of the shaft. The sleeve 5 has a furrow or keyway machined in its inner cylindrical surface, the keyway extending in an axial direction and being adapted to receive a key located on the pump shaft. The key prevents relative rotation between the lock sleeve 5 and the shaft 2.

The outer surface of lock sleeve 5 includes an annular projecting shoulder portion 6 in proximity to its lower end, with the lower surface of the shoulder being adapted to contact the end surface of the hub 4 when moved downwardly along shaft 2 under the action of nut 11.

At its lowermost end the lock sleeve is formed with an external peripheral chamfer which is adapted to engage a complementary chamfer or frusto-conical surface formed on the inner circumference of split ring 3.

As the lock sleeve 5 is moved downwardly along shaft 2, until the bottom surface of shoulder 6 contacts the hub 4, the chamfer on the lower end of the sleeve engages the frusto-conical internal surface on the split ring 3. Consequently, the radial force exerted by the sleeve chamfer expands the split ring 3 radially outwardly within recess 8, and concurrently the axial force forces split ring 3 downwardly into contact with split ring 1 so as to thereby form a rigid pump rotor hub and shaft connection. The surface of split ring 1 contacted by split ring 3 in effect acts as a thrust shoulder locking the rotor hub 4 and shaft 2 together.

While there has been shown what is considered to be the preferred embodiment of the invention, it will be obvious that modifications may be made which come within the scope of the disclosure of the specification.

What I claim is:

1. A locking arrangement comprising a rotor shaft, a pump rotor hub having a bore formed therein, said rotor hub being connected to said rotor shaft, said shaft having a portion thereof inserted in said bore of said hub; said locking arrangement comprising a peripheral groove being formed in said shaft portion, first split ring means positioned in said groove, said split ring means having an outer diameter larger than the diameter of said shaft portion; said hub having a inwardly facing internal annular recess formed therein, said first split ring means extending into said recess when said shaft portion is inserted into said hub; second split ring means positioned in said annular recess; a lock sleeve incompassing an axial segment of said shaft and having one of its ends thereof extending into said hub bore; annular shoulder means formed on the external peripheral surface of said lock sleeve contacting an end surface of said hub; nut means threadingly engaging said shaft and bearing against the other end of said locking sleeve biasing the latter into engagement with said hub, said first mentioned sleeve end having an external annular chamfer engaging said second split ring means and expanding the latter radially outwardly and into contact with said first split ring means; and resilient spring means encompassing the outer peripheral surface of respectively said first and second split ring means and radially biasing each of said split ring means into normally closed positions.

2. A locking arrangement as claimed in claim 1, said annular recess in said rotor hub forming a first and second recess portion of a step-like configuration, said second recess portion being of a diameter larger than said first recess portion, said step-like configuration defining a first recess and second recess of enlarged diameter relative to said first recess, said first split ring means being located in a first one of said portions upon insertion of said shaft portion into the bore of said hub, and said second split ring means being located in a second one of said recess portions having the enlarged diameter and having at least a portion of the end surface of said second split ring means thereof in contact with an adjacent end surface of said first split ring means.

3. A locking arrangement as claimed in claim 1, said second split ring means having an essentially frusto-conical surface being cooperatively engaged by the chamfer on said lock sleeve.

* * * * *